United States Patent
Bonanno et al.

(10) Patent No.: US 10,754,781 B2
(45) Date of Patent: Aug. 25, 2020

(54) HEURISTIC METHOD TO CONTROL FETCHING OF METADATA FROM A CACHE HIERARCHY

(71) Applicant: International Business Machines Corporation, Armonk, NY (US)

(72) Inventors: James J. Bonanno, Wappingers Falls, NY (US); Michael J. Cadigan, Jr., Poughkeepsie, NY (US); Adam B. Collura, Hopewell Junction, NY (US); Daniel Lipetz, Linden, NJ (US); Ashutosh Misra, Bangalore (IN); Brian R. Prasky, Campbell Hall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 373 days.

(21) Appl. No.: 15/443,607

(22) Filed: Feb. 27, 2017

(65) Prior Publication Data

US 2018/0246811 A1    Aug. 30, 2018

(51) Int. Cl.

| | |
|---|---|
| *G06F 9/30* | (2018.01) |
| *G06F 12/0875* | (2016.01) |
| *G06F 12/0897* | (2016.01) |
| *G06F 9/38* | (2018.01) |
| *G06F 11/34* | (2006.01) |
| *G06F 11/30* | (2006.01) |

(52) U.S. Cl.
CPC ........ *G06F 12/0875* (2013.01); *G06F 9/3806* (2013.01); *G06F 9/3848* (2013.01); *G06F 11/3409* (2013.01); *G06F 11/3466* (2013.01); *G06F 12/0897* (2013.01); *G06F 11/3024* (2013.01); *G06F 2201/88* (2013.01); *G06F 2212/1021* (2013.01); *G06F 2212/452* (2013.01)

(58) Field of Classification Search
None
See application file for complete search history.

(56) References Cited

U.S. PATENT DOCUMENTS

| | | |
|---|---|---|
| 5,584,001 A | 12/1996 | Hoyt et al. |
| 5,978,909 A | 11/1999 | Lempel |
| 6,108,775 A | 8/2000 | Shiell et al. |
| 6,823,516 B1 | 11/2004 | Cooper |
| 6,938,151 B2 | 8/2005 | Bonanno et al. |
| 7,404,070 B1 | 7/2008 | Patil et al. |

(Continued)

OTHER PUBLICATIONS

Balasubramonian et al.; Memory Hierarchy Reconfiguration for Energy and Performance in General-Purpose Processor Architectures; IEEE; 2000.*

(Continued)

*Primary Examiner* — Corey S Faherty
(74) *Attorney, Agent, or Firm* — Cantor Colburn LLP; William Kinnaman

(57) ABSTRACT

Embodiments are directed to a method for optimizing performance of a microprocessor. The method includes monitoring the performance of the microprocessor in each of a plurality of performance modes. The method further includes choosing a performance mode based on the monitoring. Thereafter, using the performance mode for a predetermined amount of time. Each of the plurality of performance modes is a branch prediction mode.

15 Claims, 3 Drawing Sheets

(56) References Cited

U.S. PATENT DOCUMENTS

| | | |
|---|---|---|
| 8,219,756 B2 | 7/2012 | Whalley et al. |
| 9,280,351 B2 | 3/2016 | Bonanno et al. |
| 2013/0339695 A1* | 12/2013 | Bonanno ............. G06F 9/30145 712/239 |

OTHER PUBLICATIONS

Juan et al.; Dynamic History-Length Fitting: A third level of adaptivity for branch prediction; ISCA '98; 1998.*

Evers eta;.; Using Hybrid Branch Predictors to Improve Branch Prediction Accuracy in the Presence of Context Switches; ISCA '96; 1996.*

Pan, et al., "Improving the Accuracy of Dynamic Branch Prediction Using Branch Correlation", Proceedings of the Fifth International Conference on Architectural Support for Programming Languages and Operating Systems, Sep. 1992, pp. 76-84, ACM, New York, NY.

Qureshi, et al., "Set-Dueling-Controlled Adaptive Insertion for High-Performance Caching", IEEE Micro, Jan. 2008, pp. 91-98, Los Alamitos, CA, IEEE Computer Society Press.

* cited by examiner

HEURISTIC METHOD TO CONTROL FETCHING OF METADATA FROM A CACHE HIERARCHY

BACKGROUND

The embodiments described herein relate in general to the field of computer processing systems. More specifically, the embodiments described herein relate to a heuristic method to control fetching of metadata from a cache hierarchy.

An instruction pipeline in a computer processor improves instruction execution throughput by processing instructions using a number of pipeline stages within the processor, where the multiple pipeline stages can act on different instructions of an instruction stream in parallel. It, therefore, allows faster processor throughput (the number of instructions that can be executed in a unit of time) than would otherwise be possible at a given clock rate. Rather than processing each instruction sequentially (finishing one instruction before starting the next), each instruction is split into a sequence of steps such that different steps of the different instructions can be executed in parallel and instructions can be processed concurrently. Issues can occur in the presence of branch instructions.

SUMMARY

Embodiments are directed to a method for improving the performance of a microprocessor. The method includes monitoring the performance of the microprocessor in each of a plurality of performance modes. The method further includes choosing a performance mode based on the monitoring. Thereafter, using the performance mode for a predetermined amount of time. Each of the plurality of performance modes is a branch prediction mode.

Embodiments are further directed to a microprocessor. The microprocessor includes branch prediction logic, a first level branch prediction cache, a second level branch prediction cache, and logic configured to optimize the performance of the microprocessor. The logic is configured to perform a method that includes monitoring the performance of the microprocessor in each of a plurality of performance modes. The method further includes choosing a performance mode based on the monitoring. Thereafter, using the performance mode for a predetermined amount of time. Each of the plurality of performance modes is a branch prediction mode.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
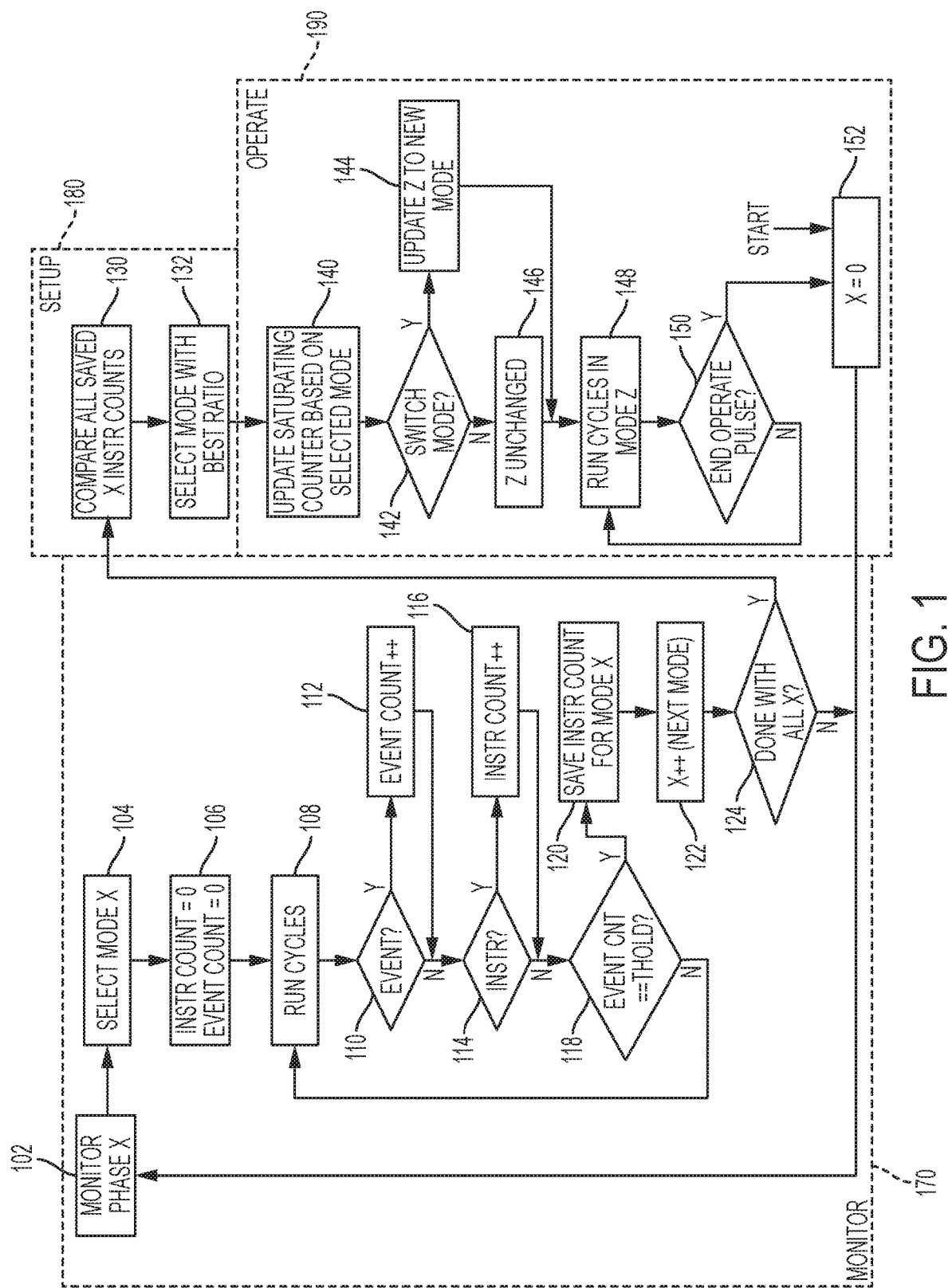
FIG. 1 is a flow diagram illustrating the operation of an exemplary embodiment.

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of algorithms is included herein, implementation of the teachings recited herein are not limited to embodiments described herein. Rather, embodiments are capable of being implemented in conjunction with any other type of system, now known or later developed.

At least the features and combinations of features described in the immediately present application, including the corresponding features and combinations of features depicted in the figures amount to significantly more than implementing an improved cache hierarchy. Additionally, at least the features and combinations of features described herein, including the corresponding features and combinations of features depicted in the figures go beyond what is well understood, routine and conventional in the relevant field(s).

As described above, a pipeline increases instruction throughput by performing multiple instructions at one time. An instruction pipeline operates in the intended manner for many different types of instructions. Each instruction in a program is fetched and executed sequentially. Branch instructions can present issues. An unconditional branch instruction retrieves the next instruction from a memory location other than the instruction that follows sequentially. Further issues can occur with conditional branch instructions. In a conditional branch instruction, the processor may or may not branch to another memory location, depending on a calculation that has not yet occurred.

A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset and/or an indirect reference through a register. After making a prediction, instructions are then retrieved from the predicted target address. If the prediction is correct, the instruction pipeline is full of the correct instructions and operation proceeds as normal. If the prediction is not correct, the remainder of the newer instructions in the instruction pipeline are discarded. Thus causing a delay in the processing of instructions.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include a branch history table and a pattern history table. A branch history table can predict the direction of a branch (taken versus not taken) as a function of the branch address. A pattern history table can assist with direction prediction of a branch as a function of the pattern of branches encountered leading up to the given branch that is to be predicted.

The BTB is a small associative memory that includes branch addresses of recently executed code, branch prediction statistics, and branch target addresses. The branch prediction logic can use the information stored in the BTB to make its predictions. The BTB can be searched in parallel to and independently from instruction fetching to find upcoming branches. This process can be referred to as look-ahead branch prediction. Alternatively, the BTB can be accessed simultaneously with or after fetching instructions and determining instruction boundaries in order to provide a prediction for each encountered branch instruction. This process can be referred to as synchronous branch prediction. In either case, performance benefits of the BTB are a function of the accuracy of the predictions provided from the BTB and the latency required to access the BTB.

A larger BTB typically stores information about more memory locations than does a smaller BTB. However, a larger BTB typically has a longer latency than a smaller BTB. A large BTB may be implemented with one or more large static random access memory (SRAM) arrays. Such large SRAM arrays often have a limited number of read and write ports (e.g., only 1 or 2) and have restrictions such that it may not be possible to both read and write to the same bank of the SRAM array in the same cycle. A small BTB can be implemented with one or more small SRAM register files. SRAM register files are often much more flexible in providing multiple read and write ports. However, multi-ported register files are often less dense than SRAM arrays, making multi-ported register files infeasible to implement a sufficiently large BTB to provide adequate performance, especially in commercial workloads with large instruction (and therefore branch) footprints.

A BTB can employ multiple levels of cache in order to improve performance. The two levels can be called the branch target pre-buffer (BTBP), a first level branch target buffer (BTB1), and a second level branch target buffer (BTB2). (This is a two-level cache because both BTBP and BTB1 are considered to be the same level. Other embodiments can use a different number of levels, both smaller and larger than three.

Figure 2:
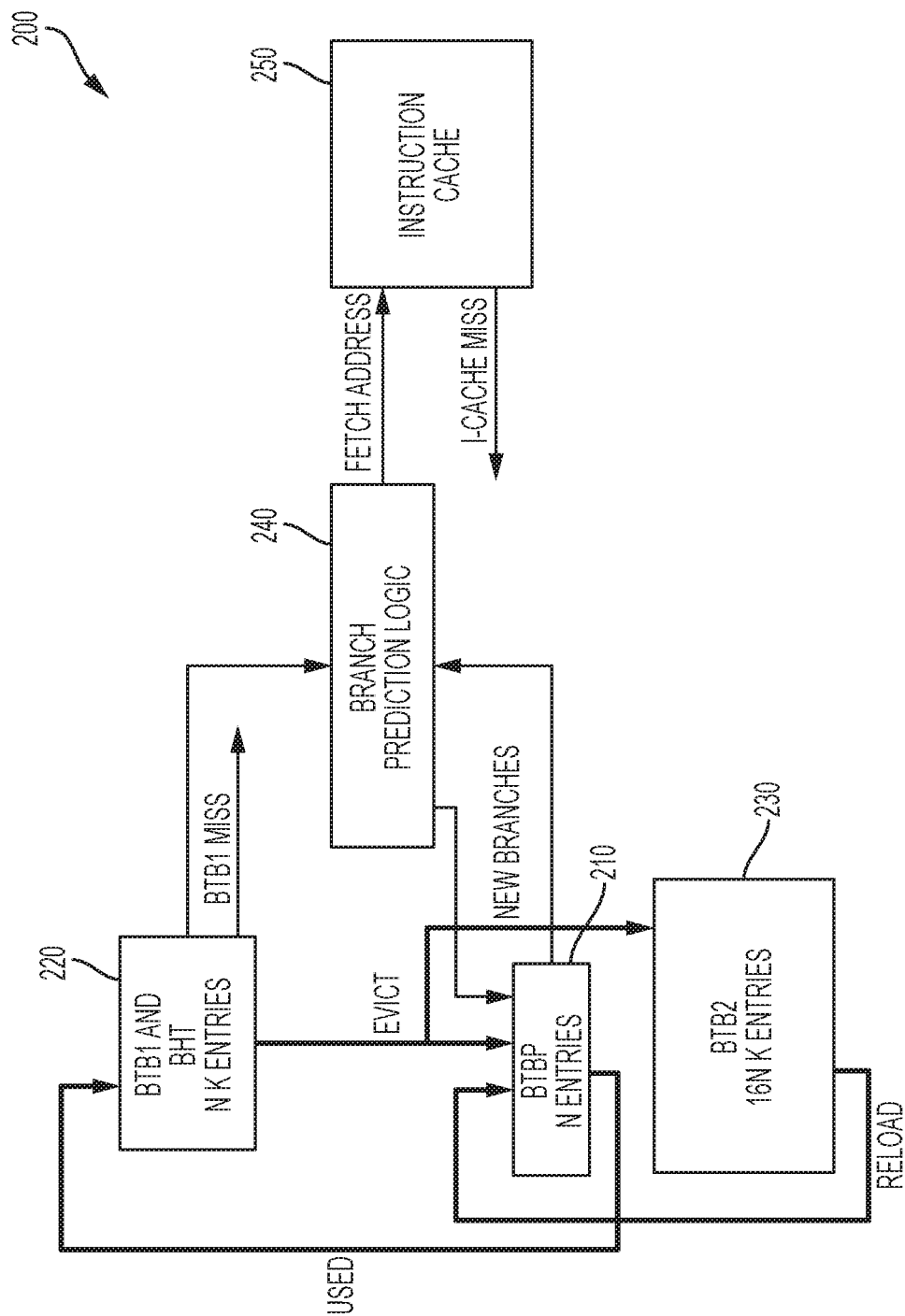
FIG. 2 is a block diagram depicting the layout of an exemplary two-level branch prediction cache.

A block diagram 200 illustrating a two-level BTB cache is presented in FIG. 2. BTBP 210 is the smallest memory. BTB1 220 is larger than BTBP 210. In embodiments, the size of BTBP is in the hundreds, BTB1 is in the thousands, and BTB2 is in the tens of thousands. BTBP 210 performs look-ups in parallel with BTB1 220—when an instruction is executed, the memory location is accessed in the BTBP 210 and BTB1 220. Those memory locations store data regarding the branch prediction statistics, branch target addresses, and the like. Also present in block diagram 200 are branch prediction logic 240 and instruction cache 250. It should be understood that the sizes described herein are merely exemplary. The actual sizes of BTBP 210, BTB1 220, and BTB2 230 can be different from those illustrated.

Branch prediction logic 240 receives inputs from BTBP 210 and BTB1 220 regarding branch history in order to make the predictions as to which instruction will be executed next. Instruction cache 250 receives addresses from branch prediction logic 240 and retrieves instructions located at that address, to speed the operation of the processor.

BTB2 230, due to its larger size and slower speed, is not accessed as often as BTBP 210 and BTB1 220. A typical use case of BTB2 230 is that when there are no hits from BTBP 210 and BTB1 220, it can be assumed that the code being currently executed might not be present in the smaller BTBP 210 and BTB1 220 (e.g., the code currently being executed has not been executed in a while because it has taken a branch not normally taken). Thus, data from BTB2 230 is transferred to BTBP 210.

A question that should be addressed is when instructions are to be moved from BTB2 230 to BTBP 210. Previous work on branch predictors have employed a fixed heuristic to know when to initiate a transfer from the level 2 cache to the level 1 cache.

A single static method might not be the most efficient method for all workloads. There are multiple techniques that can be used to react to branch prediction misses. In some instances, moving information from BTB2 230 to BTBP 210 after an instruction cache miss alone might have the best performance. In some instances, retrieving from BTB2 230 after a BTB1 220 miss alone might perform the best. In other instances, a combination of an instruction cache miss and a BTB1 miss together might have the best performance. Other techniques also can be employed. A BTB1 miss is flagged when an active BTB1 search does not find any taken/not taken branches in the instruction stream for a predetermined length of time.

Embodiments of the present invention address the above-described issues through the use of a novel method and system to regularly measure performance in various supported branch prediction modes and choose the mode of operation that gives the best performance based on prior history trends. Various performance indices can be used to determine the best performance mode over a period of time. The performance mode can change if multiple time periods show that the current performance mode is not the best mode.

A flowchart illustrating method 100 is presented in FIG. 1. Method 100 is an overview of a general method to accomplish the above-described tasks. Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, one or more of the procedures, processes, and/or activities of method 100 can be combined or skipped.

In a simplified version, the operation of method 100 can be considered to have three phases: a monitor phase 170, a setup phase 180, and an operation phase 190. During monitor phase 170, each of the branch prediction modes of the processor is cycled through for testing purposes. For example, in a processor with two different branch prediction modes for transferring metadata between metadata cache hierarchies, the first branch prediction mode is chosen. The performance of the first branch prediction mode is monitored for a set amount of time. Then the second branch prediction mode is chosen. The performance of the second branch prediction mode is monitored for a set amount of time. This can be repeated for any number of different branch prediction modes.

During setup phase 180, the performance of each branch prediction mode is compared. The branch prediction mode with the best performance is selected.

During operation mode 190, the chosen branch prediction mode is used for a predetermined period of time during normal operation of the processor. Further details of monitor phase 170, setup phase 180, and operation mode 190 now will be presented.

Within monitor phase 170 are blocks 102 through 124. A first branch prediction mode X is chosen (block 104). Several counters are initialized at zero (block 106). In an embodiment where the cycles per instruction is being measured, the counters can include an instruction counter and an event counter. Thereafter, the operation of the processor begins (block 108).

Upon the occurrence of an event (block 110), the event counter is incremented (block 112). Upon the completion of an instruction (block 114), the instruction counter is incremented (block 116). It is checked if the event counter has reached a predetermined threshold (block 118). If not, operation resumes at block 108. If the event counter has reached a threshold, then the various performance metrics are saved (block 120). The next branch prediction mode, X+1, is chosen (block 122). If X+1 is less than the number of branch prediction modes, then there is at least one more branch prediction mode to be executed and operation resumes at block 104. Otherwise, monitor phase 170 has completed and the operation goes to setup phase 180.

Setup phase 180 includes blocks 130 and 132. In block 130, the performance metrics for each of the branch prediction modes is obtained. In some embodiments, the performance metrics are obtained from the monitor phase block 120. There can be a variety of different performance metrics that can be used in various embodiments. For example, cycles per instruction (CPI) can be tracked. CPI is the ratio of the number of cycles needed (counted in the event 1 counter) to the number of instructions that are completed (counted in the event 2 counter). (In this case, an event would be the number of cycles.) A lower number is better. Another performance metric that can be used is the average branch prediction accuracy. Branch prediction accuracy is the ratio of wrong predictions (counted in the event 2 counter) to the total number of branch instructions (counted in the event 1 counter). A lower number is better. The chosen performance metric is typically set beforehand.

If CPI is the chosen metric, then the number of instructions completed is compared for each branch prediction mode (block 130). Thereafter, the branch prediction mode with the best performance is selected (block 132). Setup phase 180 is now complete and moves to operational phase 190.

Operational phase 190 includes blocks 140 through 152. A saturating counter is updated based on the selected branch prediction mode (block 140). It is then determined if the mode should be switched (block 142). The operation of the saturating counter will be described in further detail below, with respect to FIG. 3. In general, if one of the possible branch prediction modes changes from a weak state to other weak state, then the branch prediction mode switches. Otherwise, the branch prediction mode remains the same.

Based on the saturating counter, the mode can change to the new branch prediction mode Z (block 144) or remain unchanged (block 146). The processor then proceeds to operate in a normal manner (block 148). The normal operation continues for a predetermined amount of time. In some embodiments, the predetermined amount of time is on the order of one second. In some embodiments, the predetermined amount of time is in the range of hundreds of microseconds. Upon the end of the predetermined amount of time, a pulse can be generated. The pulse can be generated upon the end of the predetermined amount of time. In some embodiments, the pulse can be generated in the case of a task swap. In other words, the operational phase ends upon the generation and detection of the pulse. Upon the detection of the pulse that signifies the end of the operational phase (block 150), operation moves to reset the branch prediction mode to a first mode (block 152). From there, the operation begins again at block 104. In the absence of a pulse, operation remains at block 148.

Figure 3:
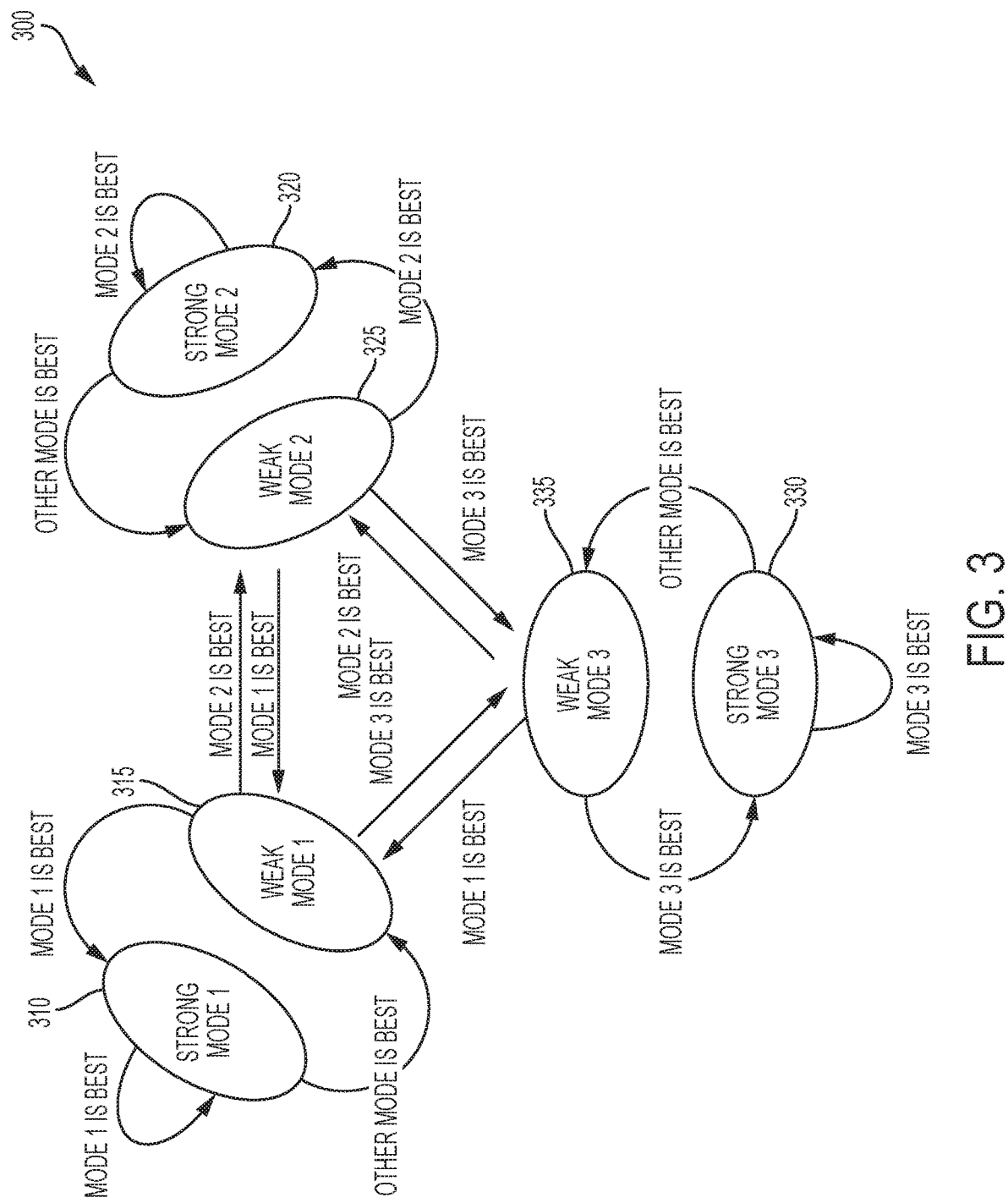
FIG. 3 depicts a diagram of saturating counter of an exemplary embodiment.

FIG. 3 presents a state diagram 300 illustrating an exemplary embodiment of the saturating counter 140. In state diagram 300, it is assumed that the system in which saturating counter 140 is placed has three different branch prediction modes. For purposes of FIG. 3, these are labeled mode 1, mode 2, and mode 3. It should be understood that the concepts presented in FIG. 3 can be extended to any number of modes.

For each of the three modes shown in FIG. 3, there are two possible states: a weak state and a strong state. For example, with respect to branch prediction mode 1, there is weak state 315 and a strong state 310. With respect to branch prediction mode 2, there is a weak state 325 and a strong state 320. With respect to branch prediction mode 3, there is a weak state 335 and a strong state 330. Upon task swapping (or context switch), the operation state of the current task is saved in a software stack. Upon the task being restored, the mode of operation can be saved as per what was saved in the software stack. The operation state of a new task is loaded or restored as a starting point, if available. If this meta-data is not available, any of the states can be chosen as a starting point, one of the states can be chosen as a starting point. In some embodiments, one of the weak states (315, 325, or 335) are chosen as a starting point. In some embodiments, the chosen weak state is random. In some embodiments, the chosen weak state is always the same. For illustrative purposes, one can assume that the starting state is weak state 315. It should be understood that any of the states can be chosen as a starting point.

From weak state 315, there are three possible inputs. Either branch prediction mode 1 has the best performance, branch prediction mode 2 has the best performance, or branch prediction mode 3 has the best performance. Based on which branch prediction mode has the best performance, the state diagram can switch to another state. If branch prediction mode 1 has the best performance, the state diagram switches to strong state 310. If branch prediction mode 2 has the best performance, the state diagram switches to weak state 325. If branch prediction mode 3 has the best performance, the state diagram switches to weak state 335. With reference to element 144 of FIG. 1, an update to a new mode only occurs when a weak state switches to another weak state of the best mode.

If one of the strong states (strong state 310, 320, or 330) is the current state, then there are two possible outcomes. If the same mode represented by the current strong state has the best performance, the state diagram remains in the same strong state. If any other mode has the best performance, the state diagram changes to the weak version of the same state (e.g., the state changes from strong state 310 to weak state 315), however the mode of operation does not change.

The flowchart and block diagrams in the Figures illustrate the architecture, functionality, and operation of possible implementations of systems and methods according to various embodiments of the present invention. In this regard, each block in the flowchart or block diagrams can represent a module or segment. In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved.

It should be understood that the examples presented herein are merely exemplary. Examples presented herein can be used in systems with greater than or less than two levels of caches. The example presented herein can be used in systems with greater than or less than three operating modes.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing performance of a microprocessor, the method comprising:
    monitoring performance of the microprocessor in each of a plurality of performance modes;
    choosing a performance mode based on the monitoring; and
    using the performance mode for a predetermined amount of time;
    wherein:
    each of the plurality of performance modes comprises different criteria for selecting when to move data between levels of a branch prediction cache hierarchy, the branch prediction cache hierarchy comprising a level two cache, a first level one cache, and a second level one cache, the level two cache larger than the first level one cache, and the first level one cache larger than the second level one cache,
    a criterion for a first performance mode of the plurality of performance modes comprises a branch prediction miss being indicated from a search process of the first level one cache content,
    a criterion for a second performance mode of the plurality of performance modes comprises a branch prediction miss being indicated from a parallel search process of both the first level one cache content and the second level one cache content, and
    a criterion for a third performance mode of the plurality of performance modes comprises an instruction miss being indicated from a search process of an instruction cache.

2. The method of claim 1, wherein monitoring, choosing, and using occur in a periodic manner.

3. The method of claim 2, wherein using comprises using the performance mode for a predetermined amount of time before repeating monitoring, choosing, and using.

4. The method of claim 1, wherein monitoring performance comprises determining cycles per instruction for each performance mode of the plurality of performance modes.

5. The method of claim 1, wherein monitoring performance comprises determining branch prediction accuracy for each performance mode of the plurality of performance modes.

6. The method of claim 1, wherein choosing the performance mode comprises:
    updating a saturation counter based on the monitoring; and
    choosing the performance mode based on the saturation counter.

7. The method of claim 6, wherein the saturation counter is configured to change a performance mode upon an occurrence of one performance mode of the plurality of performance mode having superior performance for consecutive iterations.

8. The method of claim 1, wherein monitoring performance comprises:
    selecting the first performance mode from the plurality of performance modes;
    running a predetermined number of events in the first performance mode;
    counting a number of instructions completed in the first performance mode; and
    repeating the running and counting for each performance mode of the plurality of performance modes.

9. The method of claim 1, further comprising:
    saving an operation state of a current task in a software stack; and
    upon the restoration of a task, restoring the task saved in the software stack.

10. A microprocessor comprising:
    branch prediction logic;
    a first level one cache in a branch prediction cache hierarchy;

a second level one cache in the branch prediction cache hierarchy smaller than the first level one cache;

a level two cache in the branch prediction cache hierarchy, the level two cache larger than the first level one cache; and logic configured to optimize performance of the microprocessor by performing a method comprising:

monitoring performance of the microprocessor in each of a plurality of performance modes;

choosing a performance mode based on the monitoring; and using the performance mode for a predetermined amount of time;

wherein:

each of the plurality of performance modes comprises different criteria for selecting when to move data between the first level one cache, the second level one cache, and the level two cache, a criterion for a first performance mode of the plurality of performance modes comprises a branch prediction miss being indicated from a search process of the first level one cache content, a criterion for a second performance mode of the plurality of performance modes comprises a branch prediction miss being indicated from a parallel search process of both the first level one cache content and the second level one cache content, and a criterion for a third performance mode of the plurality of performance modes comprises an instruction miss being indicated from a search process of an instruction cache.

11. The microprocessor of claim 10, wherein:

monitoring, choosing, and using occur in a periodic manner; and using comprises using the performance mode for a predetermined amount of time before repeating monitoring, choosing, and using.

12. The microprocessor of claim 10, wherein monitoring performance comprises determining cycles per instruction for each performance mode of the plurality of performance modes.

13. The microprocessor of claim 10, wherein monitoring performance comprises determining branch prediction accuracy for each performance mode of the plurality of performance modes.

14. The microprocessor of claim 10, wherein choosing the performance mode comprises:

updating a saturation counter based on the monitoring; and choosing the performance mode based on the saturation counter; wherein:

the saturation counter is configured to change a performance mode upon an occurrence of one performance mode of the plurality of performance mode having superior performance for consecutive iterations.

15. The microprocessor of claim 10, wherein monitoring performance comprises:

selecting the first performance mode from the plurality of performance modes;

running a predetermined number of events in the first performance mode;

counting a number of cycles completed in the first performance mode; and repeating the running and counting for each performance mode of the plurality of performance modes.

* * * * *